Nov. 23, 1971    YO IKEBE ET AL    3,621,762
ERROR-PREVENTING DRIVING SYSTEM FOR
ELECTROHYDRAULIC PULSE MOTOR
Filed Nov. 17, 1969    3 Sheets-Sheet 1
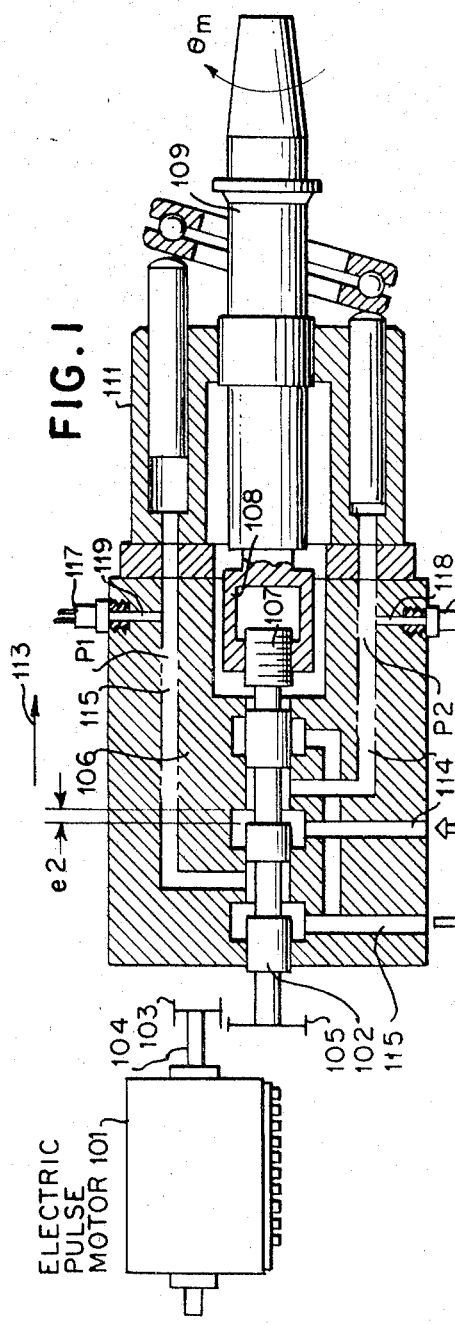
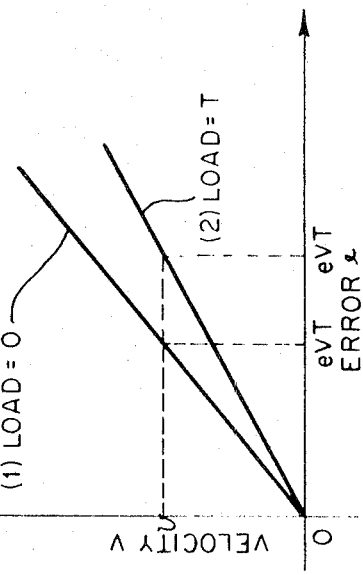
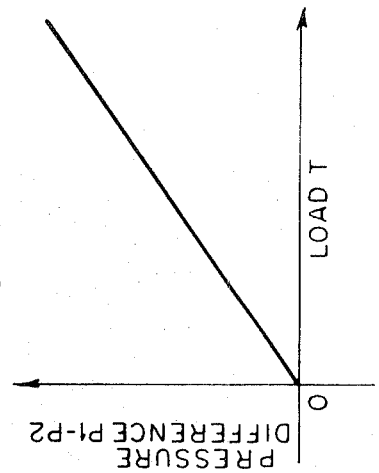

United States Patent Office 3,621,762
Patented Nov. 23, 1971

3,621,762
ERROR-PREVENTING DRIVING SYSTEM FOR ELECTROHYDRAULIC PULSE MOTOR
Yo Ikebe and Jun Ikebe, Tokyo, and Seiuemon Inaba, Kawasaki-shi, Japan, assignors to Fujitsu Limited, Kawasaki, Japan
Filed Nov. 17, 1969, Ser. No. 877,209
Claims priority, application Japan, Nov. 21, 1968, 43/85,478
Int. Cl. F01b 3/02, 13/04; F15b 9/10
U.S. Cl. 91—503
2 Claims

ABSTRACT OF THE DISCLOSURE

The gain of an electrohydraulic motor is controlled in accordance with the torque load of the motor to maintain a constant total gain and thereby decrease error.

DESCRIPTION OF THE INVENTION

The invention relates to an electrohydraulic motor. More particularly, the invention relates to an error-preventing driving system for an electrohydraulic pulse motor.

It is well known that an electrohydraulic pulse motor is a combination of an electric pulse motor, a rotary pilot valve and a hydraulic motor. The rotation of the motor is controlled by command pulses provided by a computer or a numerical control unit. The total angle of rotation is directly proportional to the number of pulses of the command pulse train. The speed of rotation of the motor thus depends upon the frequency or repetition rate of the command pulses. Even when the frequency of the command pulses is abruptly changed, for example, an irregular pulse appears in the command pulse train. When the command pulse train is a step function of the pulse train, it has been found that a pulse train smoothing circuit may be utilized to permit the electrohydraulic punlse motor to rotate accurately and without error in operation. The smoothing circuit may be considered to be a pulse train converter. It is connected between the numerical control unit and the electrohydraulic pulse motor. The input to the smoothing circuit is the command pulses. The smoothing circuit smoothes any abrupt frequency deviations to a gradual frequency change and provides an output to the electrohydraulic pulse motor. The output is the smoothed pulse train.

As hereinbefore described, the rotation of the electrohydraulic pulse motor is proportional to the frequency of the input pulse train. When the load is constant, the rotary pilot valve produces an error $e2$ which is proportional to the speed of rotation V of the electrohydraulic pulse motor. If the load varies, however, the gain $K2=V/e2$ of the electrohydraulic pulse motor also varies. If the electrohydraulic pulse motor is utilized in a machine tool numerical control system having more than two axes, the machine tool will not necessarily perform accurate cutting of the workpiece. Some error will be produced.

The principal object of the invention is to provide a new and improved error-preventing driving system for an electrohydraulic pulse motor.

An object of our invention is to provide an error-preventing driving system for an electrohydraulic motor which corrects for error in the motor.

An object of our invention is to provide an error-preventing driving system for an electrohydraulic pulse motor which functions with efficiency, effectiveness and reliability.

In accordance with the invention, an error-preventing driving system for an electrohydraulic pulse motor having a torque load, comprises a pulse train converter for controlling the gain of the motor. Command pulse means supplies a command pulse train to the motor through the pulse train converter. A detector detects the torque load of the motor and controls the gain of the pulse train converter thereby maintaining the total gain constant.

In accordance with the invention, a method of preventing error in an electrohydraulic pulse motor having a torque load comprises the steps of detecting the torque load of the motor and controlling the gain of the motor in accordance with the torque load thereof to maintain a constant total gain.

In order that the invention may be readily carried into effect, it will now be described with reference to the accompanying drawings, wherein:

FIG. 1 is a view, partly in section, of an embodiment of an electrohydraulic pulse motor controlled by the error-preventing driving system of the invention;

FIG. 2 is a graphical presentation illustrating the relation between the velocity of rotation of the motor and the error produced at different torque loads;

FIG. 3 is a graphical presentation illustrating the relation between the load of the electrohydraulic motor and the pressure difference between its oil inlet and outlet;

Figure 4:
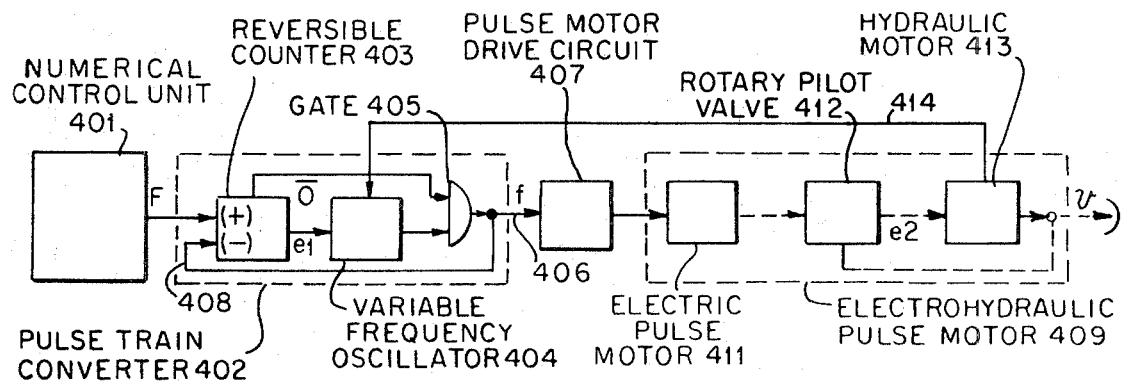
FIG. 4 is a block diagram of a servomechanism utilizing an electrohydraulic pulse motor of the type of FIG. 1.

In FIG. 1, an electric pulse motor 101 rotates a spool 102 via a gear 103 mounted on a shaft 104 driven by the electric motor 101 and a gear 105 engaged with the gear 103. The gear 103 drives the gear 105, which is affixed to the shaft on which the spool 102 is affixed. The spool 102 is coaxially positioned in a sleeve 106 and functions, with said sleeve, as a rotary pilot valve. An externally threaded member 107 is mounted at the end of the spool 102 opposite that of the gear 105. The threaded member 107 is coupled to an internally threaded member 108 affixed to the output shaft 109 of a hydraulic motor 111.

A pressurized oil source 112 provides oil under pressure for the operation of the hydraulic motor 111. When the spool 102 is rotated by the electric pulse motor 101, it may move toward the right, in the direction of an arrow 113. The oil from the pressurized oil source 112 is then supplied to the hydraulic motor 111 via an oil inlet 114. During the rotation of the output shaft 109, the oil from the hydraulic motor 111 is returned to the pressurized oil source 112 via an oil outlet 115 and the rotary pilot valve 102, 106.

A pressure detector 116 of any suitable type such as, for example, a semiconductor pressure detector, is positioned in the inlet 114 in the fixed sleeve 106. A pressure detector 117 of any suitable type such as, for example, a semiconductor pressure detector, is positioned in the outlet 115 in the sleeve 106. The pressure detector 116 determines the pressure P1 supplied to the hydraulic motor 111 via the inlet 114. The pressure detector 117 determines the pressure P2 of the oil returned by the hydraulic motor 111. The pressure detector 116 is connected to the inlet 114 via an oil conduit 118. The pressure detector 117 is connected to the outlet 115 via an oil conduit 119.

The load on the output shaft 109 of the electrohydraulic pulse motor is directly proportional to the pressure difference P1–P2, which is the difference in pressure between the inlet oil and the outlet oil of the hydraulic motor 111. The load is therefore measured by determining the pressure difference P1–P2. When the electric pulse motor 101 rotates, the spool 102 is rotated via the gears 103 and 105. The spool and the threaded member 107 are thereby moved in axial direction during the rotation of the electric pulse motor 101. The direction of axial movement of the spool 102 may be to the left. The rotation of the spool 102 produces an error e2 between the fixed sleeve 106 and said spool. Pressurized oil is supplied to the hydraulic motor 111 via the rotary pilot valve 102, 106 and thereby rotates the output shaft 109 of said hydraulic motor. Rotation of the threaded member 108 of the hydraulic motor 111 moves the spool 102 back to its initial position.

The rotation of the output shaft 109 of the hydraulic motor 111 is therefore equivalent to the rotation of the electric pulse motor 101. During normal operation, when the electric pulse motor 101 is rotating at constant speed, there is a clearance or error between the fixed sleeve 106 and the spool 102 of the rotary pilot valve. This error results in a following error e2, which is converted into pulses. The ratio of the error e2 to the speed of rotation V of the hydraulic motor 111 is $$K2 = V/e2$$

The ratio K2 at such time is equivalent to the gain of the electrohydraulic pulse motor.

In FIG. 2, the abscissa represents the error $e$ and the ordinate represents the velocity V. As shown in FIG. 2, the following error $e$ and the speed of rotation V are proportional. When the load varies, however, the proportion $V/e$, which is the gain, varies. The following error $e$ is variable, whereas the following error e2 is specific, so that said error is represented by both $e$ and e2.

In FIG. 3, the abscissa represents the load T and the ordinate represents the pressure difference P1–P2. FIG. 3 illustrates the relationship between the torque load T of the output shaft 109 of the hydraulic motor 111 and the difference in pressure P1–P2 between the inlet oil and the outlet oil. The difference in pressure between the inlet oil and the outlet oil is $$T = \frac{D(P1-P2)}{2\pi}$$

wherein D is the flow of oil under pressure per rotation of the electrohydraulic motor. The flow D of pressurized oil is constant.

In FIG. 4, a computer or numerical control unit 401 produces a command pulse train and supplies said command pulse train to a pulse train converter 402. The command pulse train has a frequency or repetition rate F. The pulse train converter includes a gain control circuit and comprises a reversible counter 403, a variable frequency oscillator 404, a gate 405 and an output 406. The output of the numerical control unit 401 is connected to an input of the reversible counter 403. An output of the reversible counter 403 is connected to an input of the variable frequency oscillator 401. An output of the reversible counter 403 is connected to an input of the gate 405. The output of the variable frequency oscillator 404 is connected to another input of the gate 405. The output of the gate 405 is connected to an input of the reversible counter 403. The output of the gate 405 is also connected to the input of a pulse motor drive circuit 407.

The pulse train converter 402 supplies the command pulses to the addition input terminal + of the reversible counter 403, which counts said pulses. The oscillator 404 produces a pulse train having a frequency $f$ which is proportional to the count of the reversible counter 403. The pulse train converter 402 transmits the output pulse from the oscillator 404 to its output 406 via the gate 405 and simultaneously reduces the count of the reversible counter 403 by being supplied, via the feedback path 408, to the subtraction input terminal − of the reversible counter 403. The count of the reversible counter 403 is reduced by 1 for each pulse supplied to its subtraction input terminal. A signal $\bar{O}$ produced by the reversible counter 403 becomes a logical 1 signal when the count of said counter is not zero. Since the signal $\bar{O}$ is supplied to an input of the gate 405, the same number of pulses as the number of command pulses are transferred to the output 406.

In the steady condition, when the frequency F of the command pulses and the output frequency $f$ of the pulse train converter 402 are equal, the number of pulses e1, corresponding to the frequency $f$ of said converter, is stored. The number e1 is the error in the pulse train converter 402. The gain K1 of the pulse train converter 402 is $$K1 = f/e1$$

The output of the pulse motor drive circuit 407 is connected to the input of the electrohydraulic pulse motor 409, which is the input to the electric pulse motor 411. The electric pulse motor 411 is coupled to the rotary pilot valve 412, which is coupled to the hydraulic motor 413 to function as the electrohydraulic pulse motor 409. The pulse motor drive circuit 407 energizes the stator windings of the electric pulse motor 411 each time an input pulse is supplied thereto. A feedback loop 414 is connected from the hydraulic motor 413 to an input of the variable frequency oscillator 404 of the pulse train converter 402.

The feedback loop 414 controls the gain of the pulse train converter after determining the pressure difference P1–P2 in the electrohydraulic pulse motor. The total gain K of the servomechanisms of FIG. 4 is $$K = \frac{V}{e1+e2} = \frac{K1}{1+\frac{K1}{K2}}$$

In the control system of FIG. 4, the total gain K is maintained constant regardless of torque load fluctuations. As may be determined from the foregoing equation, the total gain K of the converter 402 may be varied, consequently, when the gain K2 of the electrohydraulic pulse motor varies due to a variation in the torque load. The total gain K may be maintained constant by varying the gain K1 of the converter 402 accordingly.

Figure 5:
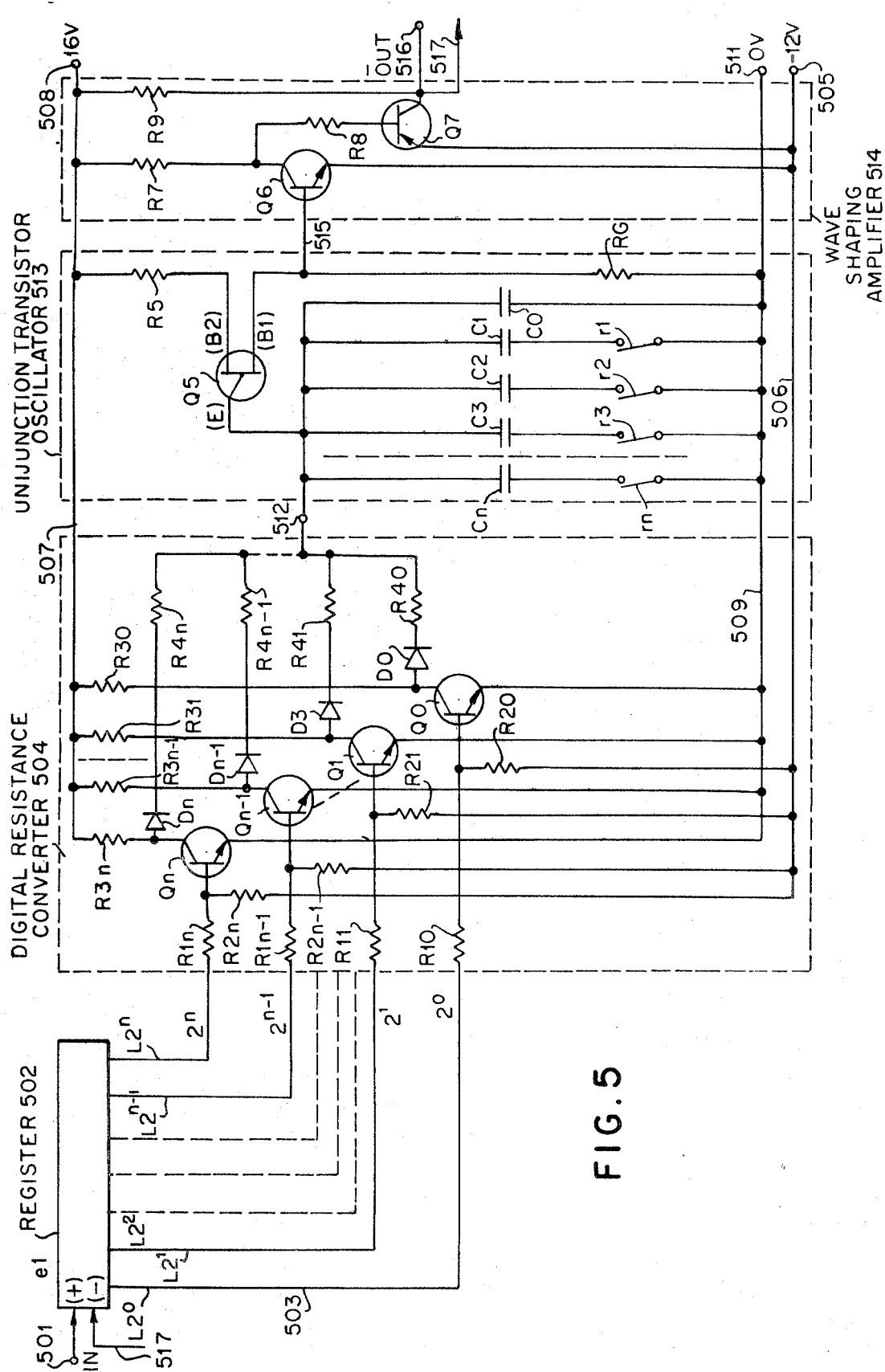
FIG. 5 is a circuit diagram of an embodiment of the gain control circuit utilized to control the electrohydraulic pulse motor of FIG. 1.

FIG. 5 is a circuit diagram of the pulse train converter 402 of FIG. 4. The pulse train converter 402 functions as a gain control circuit. The command pulses from the numerical control unit 401 of FIG. 4 are supplied to an input terminal 501 of FIG. 5. The command pulses supplied to the input terminal 501 are supplied to the input of a register 502. The register 502 functions as the reversible counter 403 of FIG. 4. The register 502 records and stores the command pulses in binary notation and has a plurality of output lines 503 which are individually identified as $L2^0, L2^1, L2^2 \ldots L2^{n-1}, L2^n$, each output line being associated with a corresponding digit and each representing the binary numerical value $2^0, 2^1, 2^2 \ldots 2^{n-1}$ and $2^n$, respectively.

The output lines 503 of the register 502 are connected to corresponding inputs of a digital resistance converter 504. The digital resistance converter 504 comprises a plurality of transistors $Q0, Q1 \ldots Qn-1, Qn$, which correspond to the output lines $L2^0, L2^1 \ldots L2^{n-1}, L2^n$ of the register 502. The base electrodes of the transistors $Q0, Q1 \ldots Qn-1, Qn$ are connected to the output lines $L2^0, L2^1 \ldots L2^{n-1}, L2^n$, respectively, via resistors $R10, R11 \ldots R1n-1, R1n$, respectively. The resistors $R10, R11 \ldots R1n-1, R1n$ have equivalent resistance values.

The base electrodes of the transistors $Q0, Q1 \ldots Qn-1, Qn$ are connected to a DC voltage source which provides −12 volts, via resistors $R20, R21 \ldots R2n-1, R2n$, respectively, and a voltage input terminal 505. The resistors $R20, R21 \ldots R2n-1, Rn$ have equivalent resistance values and are connected to the voltage terminals 505 via a line 506. The collector electrodes of the transistors Q0, Q1 ... Qn−1, Qn are connected to a DC voltage source which provides +16 volts via resistors R30, R31 ... R3n−1, R3n, respectively, a line 507 and a voltage terminal 508. The emitter electrodes of the transistors Q0, Q1 ... Qn−1, Qn are connected to a source which provides 0 volts via a common line 509 and a voltage terminal 511.

A diode D0 and a resistor R40 are connected in series circuit arrangement between the collector electrode of the transistor Q0 and an output terminal 512 of the digital resistance converter 504. A diode D3 and a resistor R41 are connected in series circuit arrangement between the collector electrode of the transistor Q1 and the output terminal 512 of the converter 504. A diode Dn−1 and a resistor R4n−1 are connected in series circuit arrangement between the collector electrode of the transistor Qn−1 and the output terminal 512. A diode Dn and a resistor R4n are connected in series circuit arrangement between the collector electrode of the transistor Qn−1 and the output terminal 512. A diode Dn and a resistor R4n are connected in series circuit arrangement between the collector electrode of the transistor Qn and the output terminal 512.

The output terminal 512 of the digital resistance converter 504 is connected to, and functions as the input terminal of a unijunction transistor oscillator 513. The unijunction transistor oscillator 513 comprises a unijunction transistor Q5. The emitter electrode of the unijunction transistor Q5 is directly connected to the terminal 512. The base electrode B2 of the unijunction transistor Q5 is connected to the line 507 via a resistor R5. The base electrode B1 of the unijunction transistor Q5 is connected to the line 509 via a resistor R6. A plurality of capacitors C0, C1, C2, C3 ... Cn are connected in parallel between the emitter electrode E of the unijunction transistor Q5 and the line 509.

The base electrode B1 of the unijunction transistor Q5 is connected to the base electrode of a transistor Q6 of a wave shaping amplifier 514 via a line 515. The emitter electrode of the transistor Q6 is directly connected to the line 506 and the collector electrode of said transistor is connected to the line 507 via a resistor R7. The collector electrode of the transistor Q6 is connected to the base electrode of a transistor Q7 via a resistor R8. The emitter electrode of the transistor Q7 is directly connected to the line 506. The collector electrode of the transistor Q7 is connected to the line 507 via a resistor R9. An output terminal 516 is directly connected to the collector electrode of the transistor Q7.

In FIG. 5, 0 volts is the equivalent of the logical value 1 and +16 volts is the equivalent of the logical value 0. The resistance values of the resistors R40, R41 ... R4n−1, R4n and R30, R31 ... R3n−1, R3n are R30+R40=10 times $2^n$ kilohms
R31+R41=10 times $2^{n-1}$ kilohms R3n−1+R4n−1=10 times $2^1$ kilohms
R3n+R4n=10 times $2^0$ kilohms The resistance equations indicate that the total resistance for a pair of resistors associated with one transistor is one half that of the next-preceding digit. That is, the combined resistance of the resistors R30 and R40 associated with the transistor Q0, which is connected to the lowest digit $2^0$ of the register 502, is the largest. The combined resistance of the resistors R31 and R41, associated with the transistor Q1, is half the resistance value, and the remaining resistance values follow in the same manner.

The register 502 stores the digital information in binary notation and, in accordance with the binary value, supplies the 0 volt or +16 volts signal to the output terminal for each digit. If the value in the register is "5" in decimal notation, the 0 voltage signal appears only at the output terminals $L2^0$ and $L2^2$. When the logical signal 0, or +16 volts, appears at all the output lines $L2^0$, $L2^1$ ... $L2^{n-1}$, $L2^n$, all the transistors Q0, Q1 ... Qn−1, Qn are in their conductive condition. When the logical value 1, or 0 volts, appears at some of the output lines $L2^0$, $L2^1$ ... $L2^{n-1}$, $L2^n$, only those transistors connected to output lines at which 0 volts appear are in their non-conductive condition.

When the contents of the register 502 are zero, all the transistors are in their conductive condition, the collector potential of each transistor becomes zero volts, and since the diodes D0, D1 ... Dn are reverse biased, the resistors R40, R41 ... R4n−1, R4n are disconnected from the circuit. When the register 502 has counted to its full capacity, all the transistors are in their non-conductive condition, the collector potential of each transistor increases, and the diodes D0, D1 ... Dn−1, Dn are forward biased. The resistors R40, R41 ... R4n are then connected in series with the resistors R30, R31 ... R3n. The combined resistance R is derived as $$R = \frac{1}{R30+R40} + \frac{1}{R31+R41} + \cdots \frac{1}{(R3n-1)+(R4n-1)} + \frac{1}{R3n+R4n}$$

Consequently, if the resistance values of the resistors R30 ... R3n and R40 ... R4n are set for the aforedescribed value, the combined resistance of the line 507 and the output line of the terminal 512 will be a value which is inversely proportional to the binary value of the register 502.

When the emitter E potential of the unijunction transistor Q5 and the capacitor C1 charge via the line including the terminal 512, the resistor circuit and the terminal 512, the potential begins to increase. When the base electrode B2 potential of the unijunction transistor Q5 reaches +16 volts, said unijunction transistor becomes conductive and the charge stored in the capacitor C0 is discharged via the base electrode B1 of said unijunction transistor and the resistor R6. When the potential of the emitter E of the unijunction transistor Q5 abruptly decreases to approximately +2 volts, said unijunction transistor is switched to its non-conductive condition and the capacitor C0 begins to charge.

The cycle T of the unijunction oscillator 513 is described as $$T = (2.3R) C \log_{10}\left[\frac{1}{1-\eta}\right]$$

wherein R is the resistance, C is the capacitance and $\eta$ is the parameter determined by the unijunction transistor circuit.

The oscillation frequency is therefore little influenced by the voltage or temperature, and variation of the resistance or capacitance digitally produces a good linear DAD conversion. Whenever the unijunction transistor Q5 is in its conductive condition, a positive voltage is applied to the line 515. This positive voltage is applied to the amplifier transistor Q6 in the wave shaping amplifier 514.

An output pulse may be provided at the output terminal 516. The capacitor C1 is connected in series circuit arrangement with a switch r1. The capacitor C2 is connected in series circuit arrangement with a switch r2. The capacitor C3 is connected in series circuit arrangement with a switch r3. The capacitor Cn is connected in series circuit arrangement with a switch rn. All of these series circuit arrangements are connected in parallel with the capacitor C0. This assists in controlling the gain of the converter of FIG. 5.

Figure 6:
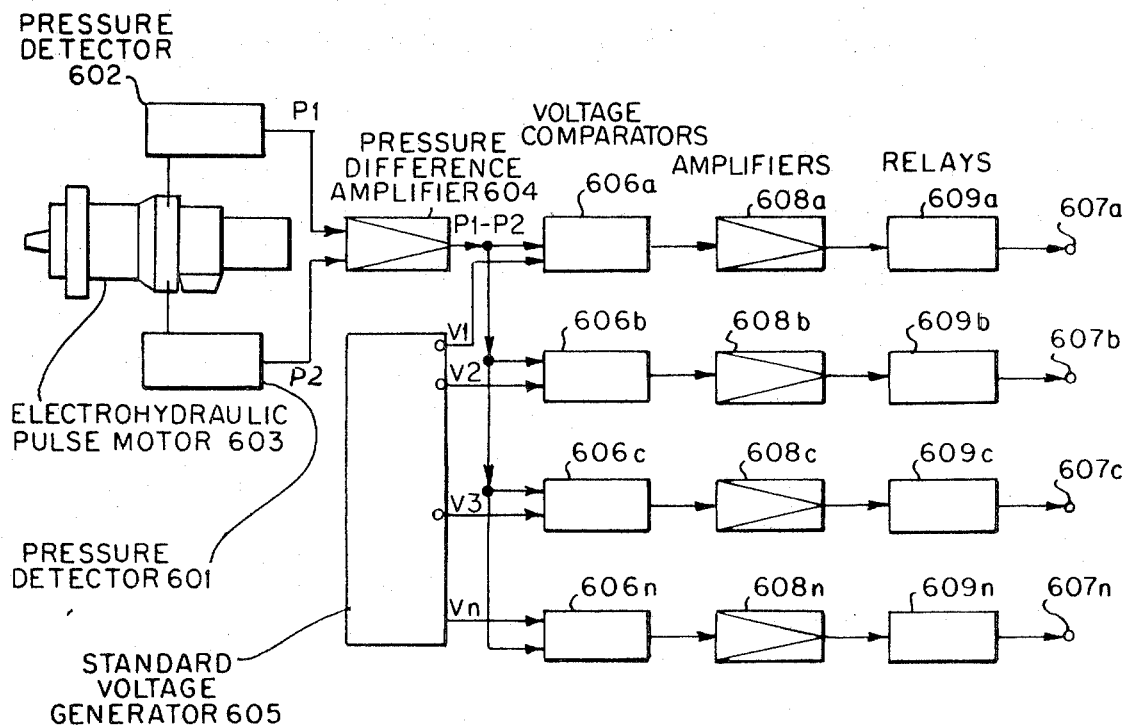
FIG. 6 is a block diagram of an embodiment of the system of the invention which controls the gain control in proportion to the detected difference in pressure between the inlet and outlet of the electrohydraulic pulse motor.

FIG. 6 illustrates the relationship between the load determination, or determination of the pressure difference, and the gain control of the converter. In FIG. 6, semiconductor pressure detectors 601 and 602 are provided in operative proximity with the ducts of the electrohydraulic pulse motor 603, as explained with reference to FIG. 1. The pressure detectors 601 and 602 determine or detect the inlet and outlet oil pressures.

The outputs of the pressure detectors 601 and 602 are supplied to the inputs of a pressure difference amplifier 604. The pressure difference amplifier 604 produces output voltage signals associated with the pressure difference P1-P2. A standard voltage generator 605 produces a plurality of preset step voltages V1, V2, V3 . . . V$n$.

Each of the standard voltages V1, V2, V3 . . . V$n$ is applied to a corresponding one of a plurality of voltage comparators 606$a$, 606$b$, 606$c$ . . . 606$n$. The voltage comparators 606$a$ to 606$n$ produce coincidence signals which are provided at corresponding output terminals 607$a$, 607$b$, 607$c$ . . . 607$n$, when the pressure difference P1-P2 compares with the standard voltage.

The input of each of a plurality of amplifiers 608$a$, 608$b$, 608$c$ . . . 608$n$ is connected to the output of a corresponding one of the voltage comparators 606$a$ to 606$n$. The input of each of a plurality of relays 609$a$, 609$b$, 609$c$ . . . 609$n$ is connected to the output of each of the amplifiers 608$a$ to 608$n$. Actually, each of the relays 609$a$ to 609$n$ is a relay winding. The relay 609$a$ controls the switch $r1$ of FIG. 5, the relay 609$b$ controls the switch $r2$ of FIG. 5, the relay 609$c$ controls the switch $r3$ of FIG. 5 . . . the relay 609$n$ controls the switch $rn$ of FIG. 5.

Thus, by providing a predetermined magnitude for the standard voltage and the capacitors C1, C2, C3 . . . C$n$, the gain of the converter is automatically controlled in accordance with the load of the electrohydraulic pulse motor and maintains the total gain of the entire servomechanism constant.

While the invention has been described by means of a specific example and in a specific embodiment, we do not wish to be limited thereto, for obvious modifications will occur to those skilled in the art without departing from the spirit and scope of the invention.

We claim:

1. An error-preventing driving system for an electrohydraulic pulse motor having a torque load, said driving system comprising command means for issuing a command pulse train; a pulse train converter connected to the command means and having reversible counter means for accumulating each of the pulses of the command pulse train, a variable frequency oscillator for producing an output pulse train having a frequency proportional to an accumulated value of the reversible counter means and feedback means from the oscillator to the counter for negatively feeding back the output pulses of the oscillator to the counter means; transmitting means for transmitting the output pulses of the oscillator to the electrohydraulic pulse motor; detecting means for detecting the torque load of the electrohydraulic pulse motor; and regulating means for regulating a ratio of the accumulated value of the counter means and the frequency of the oscillator dependent upon a detected torque load.

2. A method of preventing error in an electrohydraulic pulse motor having a torque load and driven through a pulse train converter, said method comprising the steps of detecting the torque load of the motor; and controlling the gain of the pulse train converter in accordance with the torque load thereof to maintain a constant total gain.

References Cited
UNITED STATES PATENTS

| | | | |
|---|---|---|---|
| 3,032,015 | 5/1962 | Weinstock | 91—364 |
| 3,093,946 | 6/1963 | Pitt et al. | 91—433 |
| 3,415,163 | 12/1968 | Inaba et al. | 91—364 |
| 3,457,836 | 7/1969 | Henderson | 91—380 |

PAUL E. MASLOUSKY, Primary Examiner

U.S. Cl. X.R.

91—180, 380, 433